April 16, 1957 L. Y. LACY 2,789,217

FREQUENCY DIVIDING ELECTRICAL CIRCUIT

Original Filed Feb. 28, 1946

INVENTOR
L. Y. LACY
BY Robert J. Fluskey
ATTORNEY

United States Patent Office 2,789,217
Patented Apr. 16, 1957

2,789,217

FREQUENCY DIVIDING ELECTRICAL CIRCUIT

Lester Y. Lacy, Kansas, Ill., assignor to Bell Telephone Laboratories, Incorporated, New York, N. Y., a corporation of New York Original application February 28, 1946, Serial No. 650,977, now Patent No. 2,573,150, dated October 30, 1951. Divided and this application August 3, 1951, Serial No. 240,227

1 Claim. (Cl. 250—27)

Figure 1:
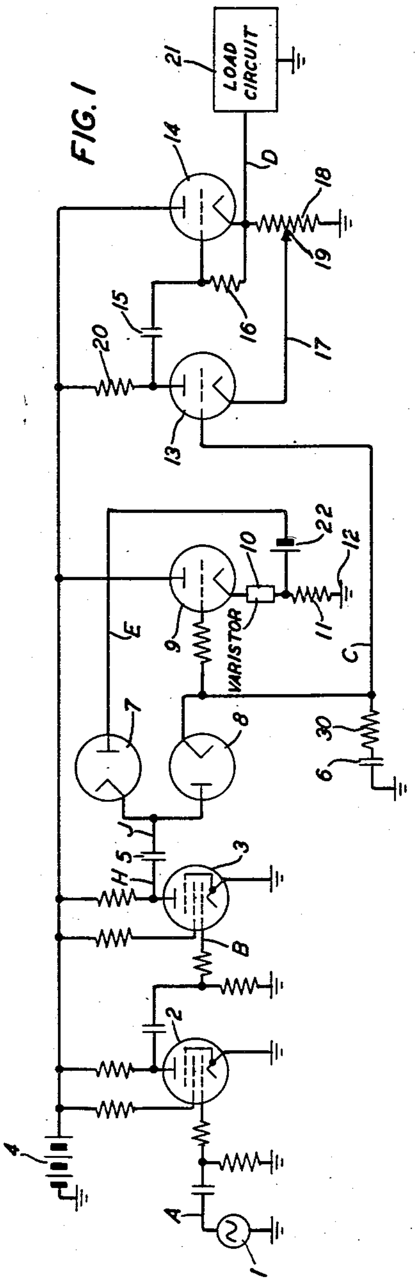

This is a division of application Serial No. 650,977, filed February 28, 1946, now United States Patent No. 2,573,150, October 30, 1951, for Electrical Circuit.

The present invention relates to circuit means employing electron discharge devices for transmitting current pulses and relates especially to such circuit means capable of transmitting pulses having a wide range of frequency, with stability and reliability.

In another aspect, the invention relates to an improved form of frequency dividing circuit of the so-called "bucket and dipper" type in which charges on a small condenser are transferred to a large condenser until a certain value of charge is built up on the latter which then discharges into a load circuit. The improvements according to the invention relate to means for equalizing the steps by which the charge is built up on the large condenser; they further relate to the discharging circuit for the large condenser. These improvements aim to increase the range of frequencies over which the circuit satisfactorily operates and also increase the range of division ratios and aid in adjusting to different ratios.

Figure 2:
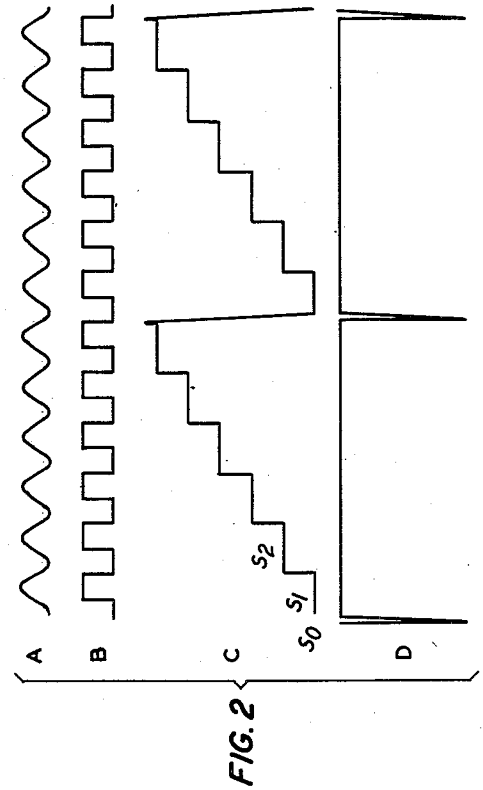

The nature and objects of the invention will appear more fully from the following detailed description of the illustrative embodiment shown in the drawing, in which:

Fig. 1 is a schematic circuit incorporating the invention and Fig. 2 shows graphs of wave forms explanatory of functions to be described in connection with Fig. 1.

The bucket and dipper method of frequency division can be made clear from considering the part of Fig. 1 from source 1 up to and including the two condensers 5 and 6 and diodes 7 and 8, all of this part of the circuit being known in the art. It is preferable to have a square pulse input at the grid of tube 3 and if these are not directly available they can be obtained from sine wave source 1 by using the type of coupling circuits shown for the grids of pentode stages 2 and 3 employing capacity-resistance networks and series grid limiting resistors. In Fig. 2, if the wave form at A of Fig. 1 is sinusoidal, a wave of square form B can be derived at the point designated B in Fig. 1. Each time the plate of tube 3 is driven positive, some current flows through condenser 5 into condenser 6 through diode 8. When the plate of tube 3 becomes less positive, some current flows in the opposite direction through condenser 5 into the plate-cathode circuit of tube 3 in series with diode 7 and through ground to point 12, but this has no effect on the charge existing on condenser 6 since diode 8 is non-conducting under these conditions. In this way, successive increments of charge are accumulated on condenser 6 as indicated by the idealized staircase curve C until a critical voltage is reached at which condenser 6 discharges into the load, producing a sharp pulse D at each discharge. The graphs are drawn in Fig. 2 to represent a division ratio of five between the frequency of the pulses in wave B and the frequency of the pulses D.

The purpose of the tube 9 is to at least partially equalize the steps at C by equalizing the amount of charge transferred each time into condenser 6. Due to the rising voltage on the ungrounded terminal of condenser 6 as its charge increases, smaller and smaller amounts of charge would be added to condenser 6 as its charge increases unless some compensating provision were made. By use of tube 9 whose grid is connected to the ungrounded terminal of condenser 6, it is possible to make the voltage at E increase at the same rate as the voltage across condenser 6. The voltage at E is determined from a point on cathode resistor 11 of tube 9. As the grid potential of tube 9 becomes more positive, more current flows through resistor 11 raising the potential at E and a point on resistor 11 can be found by trial at which the potential at E attains the right value to give the desired compensation.

The operation of the tube 9 in equalizing the steps C will now be explained by following through the circuit operation in greater detail. Assuming tube 3 to be a pentode as illustrated, the point H will vary in potential between the extremes of plus 200 volts and practically zero (ground) in a time function represented by the B wave, assuming the voltage of battery 4 to be 200 volts. Starting with condenser 6 fully discharged and tube 3 conducting at step $S_0$, when tube 3 is cut off a voltage of approximately 200 volts is applied at H to the series branch consisting of condenser 5, diode 8 and condenser 6, charging condensers 5 and 6 in series and raising the voltage on condenser 6 to $S_1$. Tube 9 is so adjusted, as explained, that the potential at point E is changed from voltage $S_0$ to voltage $S_1$ during the above interval. When the potential at H goes to zero the charge assumed placed on condenser 5 is completely wiped out and a small reverse charge is placed on it from E raising the potential at J to about $S_1$, so that when point H again goes positive, the potential at joint J now starts to rise not from $S_0$ as before but from $S_1$. The result is that when condensers 5 and 6 are charged by the increase in potential of 200 volts at point H the voltage across condenser 6 increases from $S_1$ to $S_2$ and this increase is the same as that from $S_0$ to $S_1$. This process continues through the other steps of the wave C. Another way of stating the action is that the quantity of electricity transferred is the same for each step.

As noted, curve C has been drawn with perfectly square corners on the steps and with the steps exactly equal, both of which are idealized. In practice the corners would be rounded although by using series resistance at 30 the sharpness of the corners can be increased. For frequency dividing purposes the steps need have only a required degree of equality and the use of tube 9 enables an approach to equality to be realized.

In accordance with one improvement feature of this invention a non-ohmic current-dependent resistor 10 is inserted between resistor 11 and the cathode of tube 9 to increase the negative grid bias of tube 9 in the low cathode current condition when the charge on condenser 6 is low and to reduce gradually this bias as the current through the tube increases. This prevents charging condenser 6 by a type of false operation due to initial current flow around the series loop including diodes 7 and 8, condenser 6 and resistor 11, which might occur if the potential at E were even slightly more positive than the upper plate of condenser 6. This condition can further be guarded against by use of a small battery 22 poled to apply a negative voltage to E. As the cathode-ground current of tube 9 increases, the resistance of element 10 decreases allowing a greater proportion of the potential drop in the external circuit of tube 9 to appear across resistor 11. The element 10 may, for example, be a piece of the material known to the trade as thyrite. Varistor 10, therefore, acts similarly to a negative bias battery in the grid lead of tube 9. The use of a battery at this point has the disadvantage that it must be in an ungrounded circuit. Also the total range through which the voltage of the grid of tube 9 is charged is greater using resistor 10 than it would be without this resistor, including the case where the negative grid battery is used.

A further feature of the invention comprises the discharging circuit for the condenser 6, including the tubes 13 and 14. This circuit in and of itself is a known type of flip-flop circuit having a wide frequency range of operation. By not depending upon a time constant circuit while in its stable limiting condition, use of this circuit avoids the tendency to give a false indication when the input frequency changes to a new value.

Considering the discharge circuit, the circuit is at rest and is stable in the condition where tube 14 is conducting and tube 13 is non-conducting. Tube 14 has no plate load resistor so that its cathode is at relatively high positive potential due to the current flow through resistor 18. The cathode of tube 13 is also positive, its potential being adjustable by the tap 19 on resistor 18. As the voltage builds up on condenser 6 it reaches the critical point at which tube 13 begins to transmit. Due to the large plate load resistor 20 the potential of the plate falls and drives the grid of tube 14 negative, through the coupling condenser 15. The current in resistor 18 now momentarily decreases because of the falling off of current through tube 14 and because of the limiting effect of resistor 20 on the plate current of tube 13. This action builds itself up until plate current is mostly cut off in tube 14. The potential of both cathodes falls to near ground and condenser 6 discharges through the grid-cathode circuit of tube 13.

After the condenser 6 has discharged in this manner, the circuit quickly returns to its condition of stability for at the moment of complete discharge of condenser 6 both cathodes are at substantially ground potential while the right-hand plate of condenser 15 has been carried to a potential well below ground, e. g., to —50 volts, by the drop of potential of the plate of tube 13. This sends current through grid leak resistor 16 in a direction to raise the potential of the grid of tube 14 and this tube begins to draw current raising the potential of the cathode of tube 13 relative to its grid and reducing the current flow through that tube. This action is cumulative and results in reestablishing the stable condition.

While the flip-flop circuit itself it old, its use as a discharge circuit for condenser 6 is believed new and has important advantages, the main one of which is the one mentioned above, namely, greater stability against false indication when the input frequency changes. The circuit also has the advantage of simplicity and ease of adjustment to different frequency-dividing ratios The ratio of division of frequency can be varied by varying the slider 19 on resistor 18, since this determines the critical voltage at which condenser 6 will discharge through the grid of tube 13.

If the input driving wave should go off and then after a time come on again the circuit will restart exactly in step and give the proper division of frequency. Even if the input goes off for a relatively long time, the circuit 13—14 will not send a false pulse into the load 21 for it will remain in its stable quiescent condition indefinitely. For this same reason the circuit will faithfully divide an input frequency of any value within a wide range.

What is claimed is:

A trigger circuit capable of responding to a wide range of frequencies comprising a pair of electron discharge devices each including cathode means and a grid and an anode, a condenser having means for repeatedly charging the same, a circuit for discharging said condenser across the grid-cathode space of the first of said devices upon the voltage across said condenser reaching a given critical value, said cathode means having a common connection to an external terminal, said common connection including a resistance in series with said cathode means of the second of said devices, means for including a portion only of said resistance in series with said cathode means of said first device in the discharging circuit of said condenser, said resistance portion being common to said cathode means of said pair of devices, a load circuit connected between said cathode means of said second device and said external terminal and thereby across said resistance, anode voltage supply means for both of said anodes, a large resistance connected between said supply and the anode of said first device only, and a coupling condenser from the anode of said first device to the grid of said second device.

References Cited in the file of this patent

UNITED STATES PATENTS

| | | |
|---|---|---|
| 2,185,363 | White | Jan. 2, 1940 |
| 2,250,202 | Matusita | July 22, 1941 |
| 2,402,053 | Kell | June 11, 1946 |
| 2,405,237 | Ruhlig | Aug. 6, 1946 |
| 2,411,573 | Holst et al. | Nov. 26, 1946 |
| 2,489,824 | Shenk | Nov. 29, 1949 |
| 2,549,022 | Shenk et al. | Apr. 17, 1951 |
| 2,551,771 | Spielman | May 8, 1951 |